UNITED STATES PATENT OFFICE.

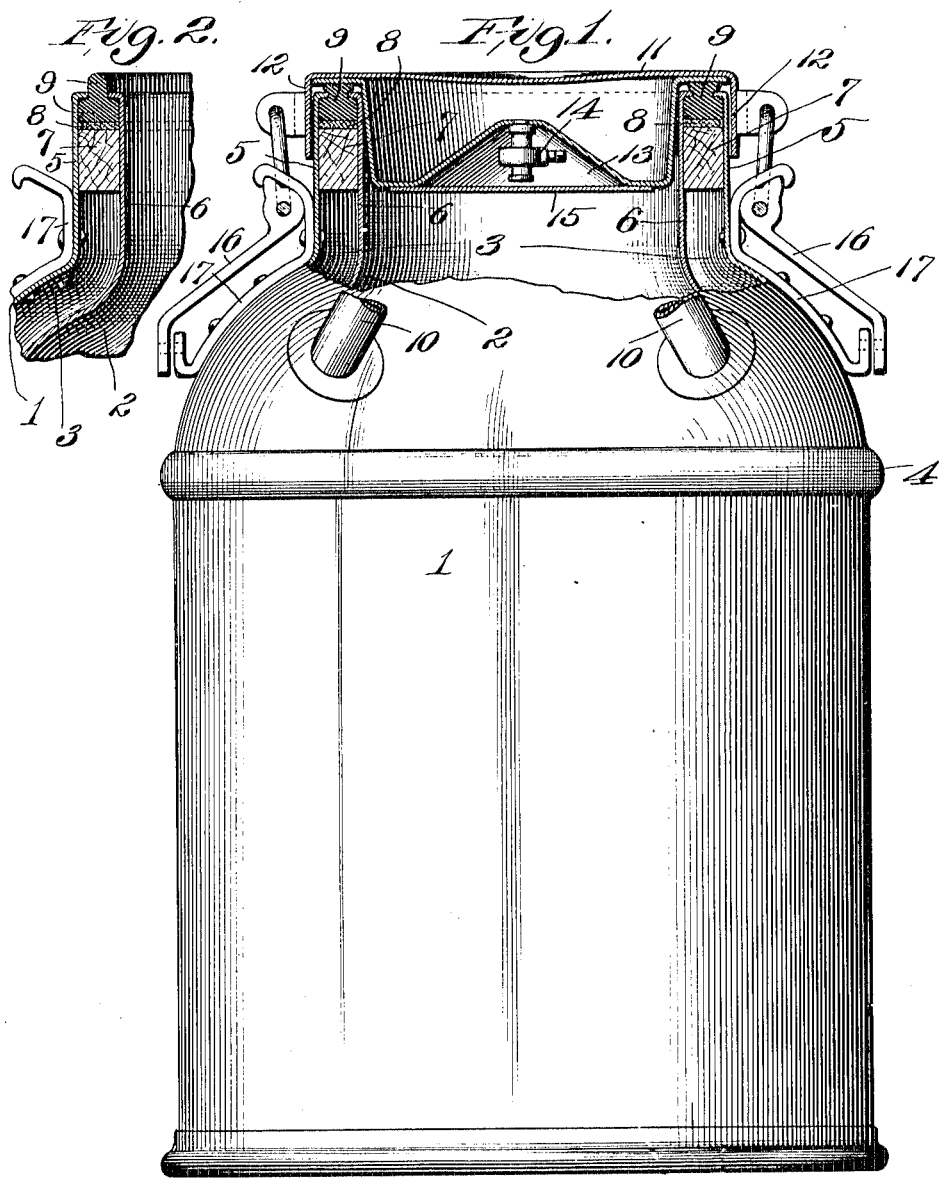

ST. VRAIN LE SIEUR, OF EAST ST. LOUIS, ILLINOIS, ASSIGNOR TO THE LE SIEUR VACUUM CAN MANUFACTURING COMPANY, OF EAST ST. LOUIS, ILLINOIS, A CORPORATION OF ILLINOIS.

VACUUM MILK-CAN.

1,119,968.   Specification of Letters Patent.   Patented Dec. 8, 1914.

Original application filed September 5, 1911, Serial No. 647,719. Divided and this application filed April 19, 1912, Serial No. 691,930. Renewed December 8, 1913. Serial No. 805,348.

*To all whom it may concern:*

Be it known that I, ST. VRAIN LE SIEUR, a citizen of the United States, and resident of East St. Louis, St. Clair county, Illinois, have invented certain new and useful Improvements in Vacuum Milk-Cans, of which the following is a specification, containing a full, clear, and exact description, reference being had to the accompanying drawings, forming a part hereof.

My invention relates to improvements in vacuum milk cans, and it consists in the novel construction and combination of parts hereinafter set forth and pointed out in the appended claims.

The object of my invention is to provide an improved vacuum milk can for use in shipping and storing milk and cream and preserving the contents against fermentation and other deleterious effects caused by heat.

A further object is to provide a vacuum milk can which will be strong, durable, and cheap in construction, and which will be highly efficient and convenient in operation.

In the drawings: Figure 1 is a sectional elevation of a milk can having my invention applied thereto; and Fig. 2 is a detail, sectional elevation of a portion of the upper end of the can.

This application is a division of my prior application filed September 5, 1911, Serial No. 647,719.

The numeral 1 indicates the outer can, and 2 the inner can, the two cans being separated by a space 3 from which the air is exhausted.

It is very important, in a vacuum milk can, that the inner can be insulated from the outer can, to prevent the conduction and radiation of heat from the external can to the internal can, and in carrying out my invention I have carefully insulated the inner can, so that it will have no metallic connection whatever with the external can.

The outer can 1 is made of very strong sheet metal and is provided at the base of the breast with the usual strengthening hoop 4.

The means for supporting and bracing the bottom of the cans, forms no part of my present invention, and I have therefore limited the illustration herein to the details of the necks and cover.

The upper ends of the necks 5 and 6, of the outer and inner cans respectively, are held apart by a ring 7 of wood or similar non-conductive material, and upon the upper edge of said ring is placed a body of common cement 8, and a rubber ring 9 is mounted upon said body of cement and the upper edges of said necks are each turned inwardly and brought forcibly down upon said rubber ring, so that a portion of said rubber ring will project upwardly between the adjacent in-turned portions of the said necks and form a gasket for the cover to rest upon.

The can is provided with the usual form of handles 10.

The numeral 11 indicates a vacuum cover in the form of a hollow cylindrical body from which the air is exhausted. Said cover projects downwardly within the neck of the inner can to a point approximately even with the plane at the lower edge of said wooden ring 7, and the said cover is also provided with an exterior depending flange 12 which extends downwardly a considerable distance upon the neck of the outer can. Formed in the lower end of the cover 11 is a conical depression 13 in which is concealed and protected a common needle-valve 14, the outer end of the needle of which is adapted to be engaged by a common wrench or key, for the purpose of opening or closing said needle valve, in the operation of exhausting the air from the vacuum chamber of said cover. Said needle-valve is adapted to have connected to it in the usual way a hose (not shown) leading from any suitable vacuum pump or exhauster, to exhaust the air from said vacuum chamber. The said needle-valve 14 is concealed and protected within said conical depression 13 by means of a metal plate 15 removably fixed, by means of solder, on the lower end of said cover.

As I make no claim in the present application to means for exhausting the air from the space between the outer and inner cans, I have not shown a needle-valve for the said space, but will say that in practice another and separate needle-valve is provided for said space, as shown and described in my prior application, Serial No. 647,719, previously referred to.

The cover 11, when in use, is adapted to be hermetically sealed in place on the upper end of the can necks, by being forcibly clamped in position upon said necks as shown, thereby flattening the rubber gasket 9, for such purpose.

The means for clamping the cover in position are the clamping levers 16 and the clamping and sealing brackets 17, which need not be described in detail, as they are not claimed herein specifically, but are specifically described and claimed in my prior application previously referred to.

The operation of my invention is obvious and need not be described further in details, except to say that milk placed within the inner can, at a lower temperature than the external aperture, will retain its temperature with but slight variation for a considerable period, since the space 3 presents a guard or protecting medium of an indifferent heat-conducting quality.

Milk cans constructed as described will be specially valuable in transportation, as they will serve to keep the milk in a fresh and cool condition throughout and after the period of transit. The wood ring 7 greatly strengthens the neck of the can.

I claim:

1. The improved milk can, comprising the outer and inner cans separated by a space from which the air is to be exhausted, necks for said cans, a wood ring located in the space between said necks, a body of cement also in said space on the upper surface of said wood ring, a compressible gasket also in said space above said body of cement, and the upper edges of the said necks turned inwardly to forcibly contact with said compressible gasket leaving a portion of the gasket free between said inturned edges, a suitable cover, and means for clamping said cover in position upon said gasket.

2. The improved vacuum milk-can, comprising an outer can and an inner can separated by a space from which the air is exhausted, a suitable gasket located in the space between said outer and inner cans, at the upper ends of the latter and forming a non-metallic connection between the upper ends of said cans, and also acting as a gasket to hermetically seal a cover in position upon said gasket, and a vacuum-cover having a space from which the air is exhausted and hermetically sealed in position upon the said gasket.

In testimony whereof, I have signed my name to this specification, in presence of two subscribing witnesses.

ST. VRAIN LE SIEUR.

Witnesses:
E. L. WALLACE,
JOHN C. HIGDON.